No. 791,773.

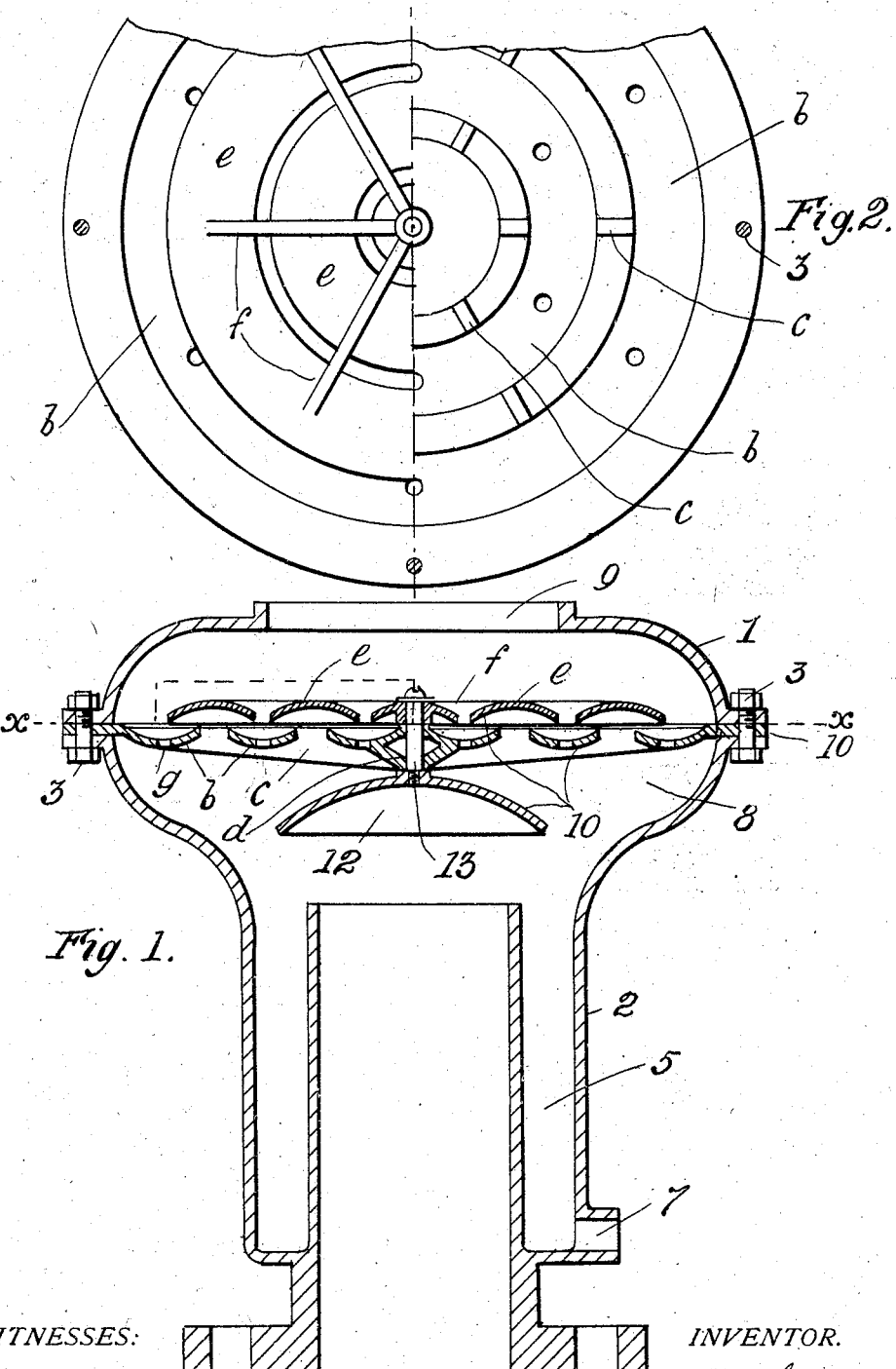

Patented June 6, 1905.

UNITED STATES PATENT OFFICE.

ARTHUR J. GREENAWAY, OF DETROIT, MICHIGAN, ASSIGNOR TO THE GREENAWAY COMPANY, OF DETROIT, MICHIGAN, A CORPORATION OF MICHIGAN.

EXHAUST-HEAD.

SPECIFICATION forming part of Letters Patent No. 791,773, dated June 6, 1905.

Application filed January 14, 1905. Serial No. 241,161.

*To all whom it may concern:*

Be it known that I, ARTHUR J. GREENAWAY, of the city of Detroit, in the county of Wayne and State of Michigan, have invented certain Improvements in Exhaust-Heads, of which the following is a specification.

The principal object of this invention is to collect lubricatory oil carried with the exhaust-steam from a steam-engine; and it consists in improved means whereby the exhaust-steam carrying the oil in escaping is brought into contact with surfaces which cause it to take a circuitous passage, whereby the globules of oil are aggregated and allowed to flow with any condensed steam by the force of gravity to a common receptacle, from which they are drawn for separation.

In the further description of the said invention which follows reference is made to the accompanying drawings, forming a part hereof, and in which—

Figure 1 is a vertical central section of the improved exhaust-head; and Fig. 2, a cross-section of Fig. 1, taken on the dotted line $xx$, except that the upper portion is torn away.

Referring now to the drawings, it will be seen that the shell or casing of the apparatus is in two parts or sections 1 and 2, which are flanged and connected by bolts 3. The lower end also of the section 2 is flanged in order that it may be secured to the exhaust-pipe (not shown) leading from a steam-engine. A portion of the wall of the lower section 2 is made double, whereby an annular open-top chamber 5 is formed for the collection of condensed steam and any oil with which the steam is charged. A nozzle 7, leading from the annular chamber, is preferably interiorly threaded, and into it is screwed a pipe (not shown) for draining the said chamber of water and oil. The upper section 1 of the shell or casing is annular, and the central opening 9 has an area considerably in excess of that portion of section 2 which first receives the exhaust-steam. The upper end of the section 2 is flared outwardly to increase its diameter and transverse area and forms, with the annular section 1, the chamber 8, in which a large portion of the exhaust-steam is condensed and the globules of oil mechanically mixed with the steam aggregated by means of a peculiarly-constructed baffle-plate, which as an entirety is denoted by 10. This baffle-plate consists of three members: first, a series of separated dished concentric rings $b$, which are held together by ribs $c$, extending radially from a central hub $d$. The outer dished ring is flanged, and the flange is interposed between the sections 1 and 2 and held in place by the bolts 3, before referred to. The second member of the baffle-plate consists of a series of separated dished rings $e$, held together by ribs $f$ in a manner similar to the first member, which rings are inverted in position and cover the annular spaces between the lower rings. The effect of the two series of dished rings arranged as described is to cause the exhaust-steam in escaping to take a circuitous passage and come in contact with a large area of oil-collecting surface. To prevent the lower rings $b$ holding water and oil, they are provided with a few small holes $g$, as shown. The third member of the baffle-plate consists of an inverted-cup-shaped plate 12, of a larger diameter than the inner wall of the lower section of the casing or shell 2 and situated directly over it. It is provided with a bolt 13, whereby the three members of the baffle-plate are secured together. The vertical distance between the edge of the inner wall of the section 2 and the inverted-cup plate, together with the enlargement of the outer wall, provides a comparatively unobstructed passage for steam to the baffle-plate.

Steam entering the exhaust-head strikes the inverted-cup-shaped plate, and the condensed steam, together with any oil that may be mixed with it, drips from the edge of the plate to the annular chamber 5 and passes thence through the nozzle 7 to the drain-pipe, which, as before stated, is not shown. The uncondensed steam then passes to the baffle-plate, where further condensation takes place, the water, with the oil mixed with it, falling to the chamber 5, and the uncondensed steam escaping through the central aperture 9 in the section 1 of the head. Owing to the large surface with which the exhaust-steam has to come in contact, very little of the oil carried with the steam is lost.

The baffle-plate being practically a single element, the whole apparatus consists of but three parts, which may be easily and rapidly connected by the bolts 3, and is adaptable to any exhaust-steam pipe.

I claim as my invention—

1. In an exhaust-head, the shell or casing thereof formed in two flanged parts or sections, the lower section having an annular water and oil collecting chamber with an outlet therefrom, combined with a baffle-plate with circuitous passages therein which is interposed between the flanges of the two sections, bolts which pass through the two sections and the baffle-plate, to hold the three parts together, and a concave plate to conduct water of condensation falling from the baffle-plate to the water and oil collecting chamber, substantially as specified.

2. In an exhaust-head, the shell or casing thereof formed in two parts or sections, the lower part or section having a water and oil collecting chamber with an outlet leading therefrom, combined with a baffle-plate which is interposed between the upper and lower sections of the head, the said baffle-plate consisting of a series of dished, separated rings suitably tied together, a similar series of rings situated over the first series, in an inverted position and covering the spaces between the lower rings and a deflecting-plate situated under the lower series of rings adapted to conduct water of condensation to the said water and oil collecting chamber, substantially as specified.

ARTHUR J. GREENAWAY.

Witnesses:
GORDON A. HARRIS,
KATHERINE F. HOEPPNER.